(12) United States Patent
Fujii et al.

(10) Patent No.: US 8,984,960 B2
(45) Date of Patent: Mar. 24, 2015

(54) ULTRASONIC FLOW RATE MEASUREMENT DEVICE HAVING INLET SIDE FLOW RECTIFICATION PART AND OUTLET SIDE COUPLING PART

(75) Inventors: Yuji Fujii, Nara (JP); Yukinori Ozaki, Nara (JP); Masato Satou, Nara (JP); Hirokazu Gotou, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 123 days.

(21) Appl. No.: 13/821,915

(22) PCT Filed: Nov. 2, 2011

(86) PCT No.: PCT/JP2011/006135
§ 371 (c)(1),
(2), (4) Date: Mar. 8, 2013

(87) PCT Pub. No.: WO2012/063437
PCT Pub. Date: May 18, 2012

(65) Prior Publication Data
US 2013/0167655 A1  Jul. 4, 2013

(30) Foreign Application Priority Data
Nov. 10, 2010 (JP) .................. 2010-251466

(51) Int. Cl.
*G01F 1/66* (2006.01)
*G01F 15/18* (2006.01)
(52) U.S. Cl.
CPC .............. *G01F 1/662* (2013.01); *G01F 15/185* (2013.01)
USPC ...................................................... 73/861.27
(58) Field of Classification Search
None
See application file for complete search history.

(56) References Cited

U.S. PATENT DOCUMENTS

| 6,026,693 | A | 2/2000 | Baumoel et al. |
| 7,237,441 | B2 * | 7/2007 | Umekage et al. ........... 73/861.27 |
| 7,252,015 | B2 * | 8/2007 | Konzelmann et al. ..... 73/861.25 |

(Continued)

FOREIGN PATENT DOCUMENTS

| DE | 10 2006 023 479 A1 | 11/2007 |
| DE | 102006023479 A1 | 11/2007 |

(Continued)

OTHER PUBLICATIONS

International Search Report for International Application No. PCT/JP2011/006135, dated Nov. 29, 2011, 2 pages.

(Continued)

*Primary Examiner* — Harshad R Patel
(74) *Attorney, Agent, or Firm* — Brinks Gilson & Lione (57) ABSTRACT

Ultrasonic flow rate measurement device includes measurement flow path in which a fluid to be measured flows, and a pair of ultrasonic vibrators that are disposed in directions such that a propagation path of an ultrasonic wave forms a V-shape relative to measurement flow path. Moreover, the device includes measurement circuit which measures a flow rate of the fluid to be measured by measuring a propagation time of the ultrasonic wave between the pair of ultrasonic vibrators, and inlet-side rectification part which is disposed, in the inlet side of measurement flow path, to stabilize the flow of the fluid to be measured. Furthermore, the device includes outlet-side coupling part which is disposed in the outlet side of measurement flow path, and signal lead-out part which outputs a flow rate value measured with measurement circuit.

10 Claims, 7 Drawing Sheets

(56) References Cited

U.S. PATENT DOCUMENTS

| | | | |
|---|---|---|---|
| 2010/0101664 A1* | 4/2010 | Yamamoto et al. | 137/486 |
| 2011/0238333 A1 | 9/2011 | Miyata et al. | |
| 2012/0318069 A1* | 12/2012 | Murakami | 73/861.18 |
| 2013/0036832 A1* | 2/2013 | Watanabe et al. | 73/861.18 |
| 2013/0124131 A1* | 5/2013 | Murakami | 702/100 |
| 2013/0263677 A1* | 10/2013 | Miyata et al. | 73/861.29 |
| 2013/0312537 A1* | 11/2013 | Miyata et al. | 73/861.28 |

FOREIGN PATENT DOCUMENTS

| | | | |
|---|---|---|---|
| EP | 1 876 427 A1 | 1/2008 | |
| EP | 1876427 A1 | 1/2008 | |
| GB | 2043900 A | 10/1980 | |
| JP | 09-189591 A | 7/1997 | |
| JP | 11-201791 A | 7/1999 | |
| JP | 2000-146645 A | 5/2000 | |
| JP | 2009-186430 A | 8/2009 | |
| JP | 2010-066068 A | 3/2010 | |
| JP | 2010-164558 A | 7/2010 | |
| WO | WO 2007/134982 A1 | 11/2007 | |

OTHER PUBLICATIONS

European Search Report dated Jun. 5, 2014, issued on European application No. 11840044.9, 6 pages.

English language translation of Search Report in corresponding Chinese Application No. 201180054446.7, dated Oct. 23, 2014, 3 pages.

* cited by examiner

ULTRASONIC FLOW RATE MEASUREMENT DEVICE HAVING INLET SIDE FLOW RECTIFICATION PART AND OUTLET SIDE COUPLING PART

This application is a 371 application of PCT/JP2011/006135 having an international application date of Nov. 2, 2011, which claims priority to JP2010-251466 filed Nov. 10, 2010, the entire contents of which are incorporated herein by reference.

TECHNICAL FIELD

The present invention relates to ultrasonic flow rate measurement devices that measure a propagation time of an ultrasonic wave by using a pair of ultrasonic vibrators capable of transmitting and receiving an ultrasonic signal, and thereby measure a flow rate of a fluid to be measured.

BACKGROUND ART

Conventional ultrasonic flow rate measurement devices are generally configured as follows: An inflow and outflow ports for gases are disposed in the top face of a flowmeter in order to install the device by hanging from piping, or an inflow and outflow ports of a flowmeter are coupled with straight piping. In particular, the flowmeter for use in such as a gas meter is configured as follows: The inflow and outflow ports are coupled with each other via a U-shaped and cylindrical gas-flow path member that is disposed in the inside of the gas meter, and a measuring tube for measuring a gas flow velocity is disposed in the gas-flow path member (see Patent Literature 1, for example).

Figure 7:
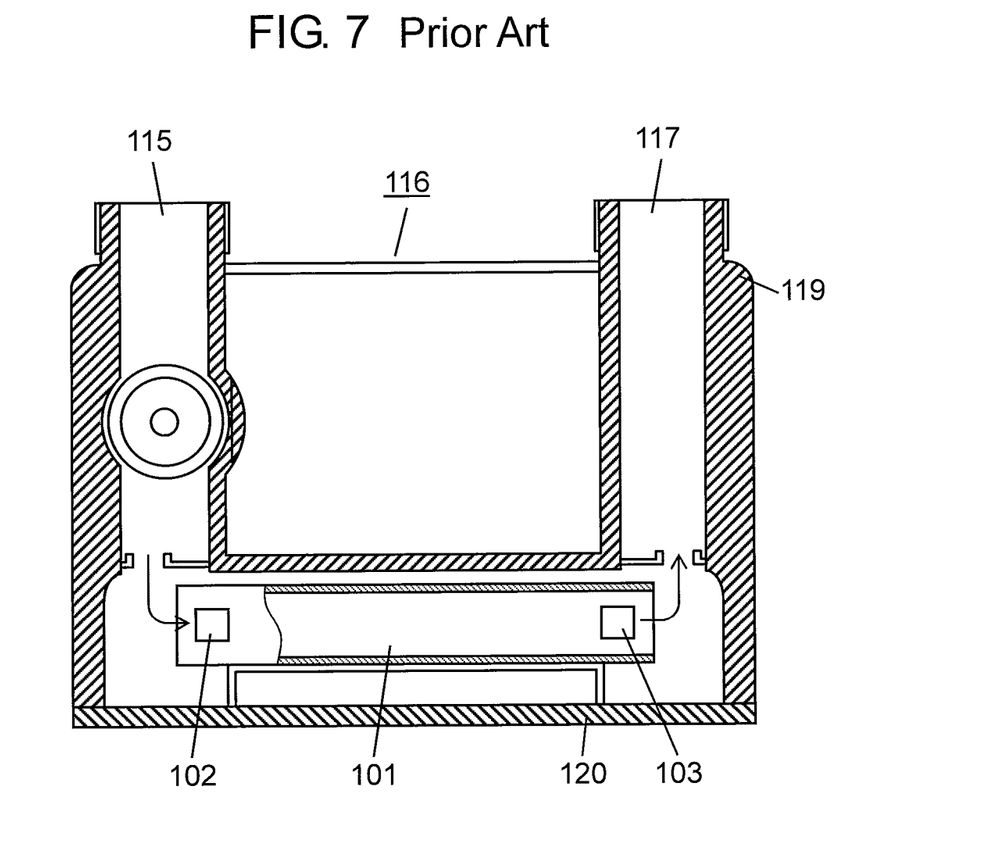
FIG. 7 is a cross-sectional view of a conventional ultrasonic gas meter.

FIG. 7 is a cross-sectional view of a conventional ultrasonic gas meter.

As shown in FIG. 7, inflow port 115 and outflow port 117 for gases are disposed in the top face of gas meter 116 that is formed in a rectangular box shape. The gas meter is configured such that inflow port 115 and outflow port 117 are coupled with each other via gas-flow path member 119 that is formed to be cylindrical and U-shaped.

In bottom face part 120 of the U-shaped flow path, measurement flow path 101 is disposed which measures a flow rate of a gas based on a propagation time of an ultrasonic wave. Measurement flow path 101 is equipped with ultrasonic vibrator 102 in the upstream side and ultrasonic vibrator 103 in the downstream side, with the vibrators facing each other.

Conventionally, however, it is necessary to modify the shape of the measurement flow path, the coupling configuration of the ultrasonic vibrators and a measurement circuit, and the like, depending on the piping with which the flowmeter is coupled, installation sites, applications, and the like. This has been a problem that additional time and costs are needed for development of secured measurement accuracy, resulting in inefficiency.

Patent Literature 1: Japanese Patent Unexamined Publication No. 2009-186430

SUMMARY OF THE INVENTION

The present invention is made in view of the aforementioned problem, and is intended to provide an ultrasonic flow rate measurement device which has no need for modifying the shape of a measurement flow path, coupling configurations of ultrasonic vibrators and a measurement circuit, and the like, depending on piping with which a flowmeter is coupled, installation sites, applications, and the like.

The invention is aimed at providing the ultrasonic flow rate measurement device that includes: a measurement flow path through which a fluid to be measured flows, and a pair of ultrasonic vibrators which are disposed in directions such that a propagation path of an ultrasonic wave forms a V-shape relative to the measurement flow path. Moreover, the device includes: a measurement circuit which measures a flow rate of the fluid to be measured by measuring a propagation time of the ultrasonic wave between the pair of ultrasonic vibrators, and an inlet-side rectification part which is disposed, in the inlet side of the measurement flow path, to stabilize the flow of the fluid to be measured. Furthermore, the device includes: an outlet-side coupling part which is disposed in the outlet side of the measurement flow path, and a signal lead-out part which outputs a flow rate value measured with the measurement circuit.

DETAILED DESCRIPTION OF THE PREFERRED EMBODIMENTS

Hereinafter, embodiments of the present invention will be described, with reference to the accompanying drawings. Note that the present invention is not limited to the embodiments.

First Exemplary Embodiment

Figure 1:
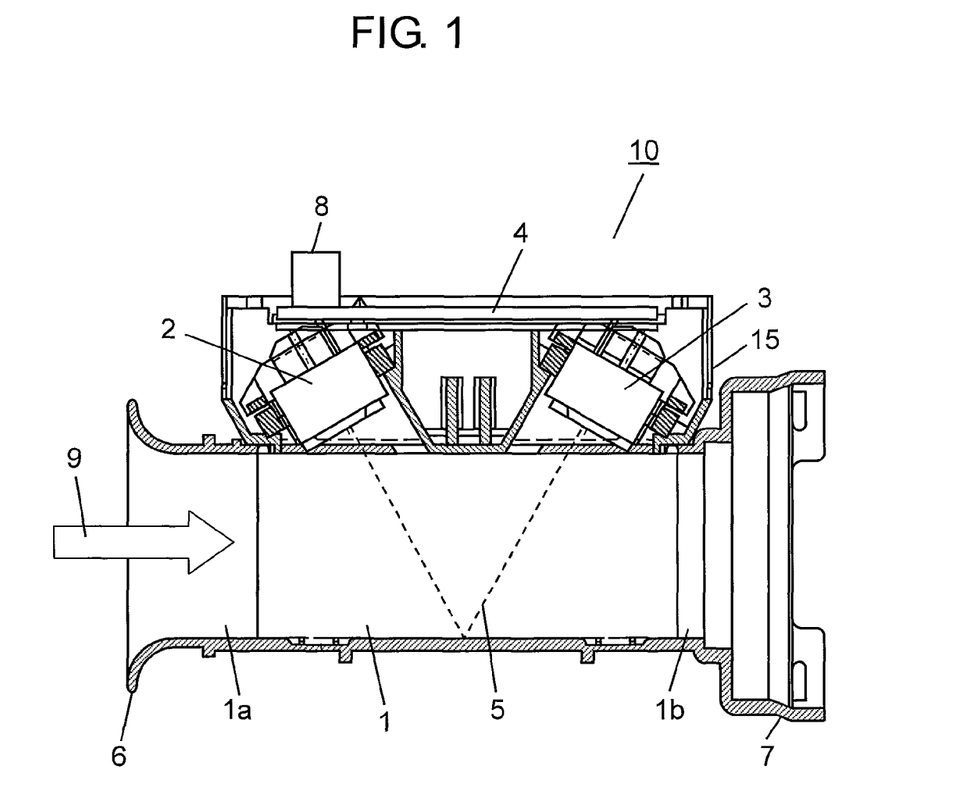
FIG. 1 is a cross-sectional view illustrating a configuration of an ultrasonic flow rate measurement device according to a first embodiment of the present invention.

FIG. 1 is a cross-sectional view illustrating a configuration of ultrasonic flow rate measurement device 10 according to a first embodiment of the present invention.

As shown in FIG. 1, ultrasonic flow rate measurement device 10 includes measurement flow path 1, a pair of ultrasonic vibrators 2 and 3, measurement circuit 4, inlet-side rectification part 6, outlet-side coupling part 7, and signal lead-out part 8.

Through measurement flow path 1, a fluid to be measured flows.

The pair of ultrasonic vibrators 2 and 3 are disposed in directions such that a propagation path of an ultrasonic wave forms a V-shape relative to measurement flow path 1.

Measurement circuit 4 measures a propagation time of the ultrasonic wave between ultrasonic vibrators 2 and 3, and thereby measures a flow rate of the fluid to be measured.

Inlet-side rectification part 6 is disposed in the inlet side of measurement flow path 1 to stabilize the flow of the fluid to be measured.

Outlet-side coupling part 7 is disposed in the outlet side of measurement flow path 1.

Signal lead-out part 8 outputs, to the outside, a flow rate value measured with measurement circuit 4.

Flow direction 9 indicated by the arrow is the direction in which the fluid to be measured flows.

In this way, ultrasonic flow rate measurement device 10 according to the first embodiment is such that measurement circuit 4 and the pair of ultrasonic vibrators 2 and 3 are assembled as one device (measurement part 15), and mounted to measurement flow path 1. Moreover, outlet-side coupling part 7 is disposed only in outlet side 1b of measurement flow path 1. These configurations allow ultrasonic flow rate measurement device 10 with ease of installation. Coupling to piping will be described later.

Inlet-side rectification part 6 is disposed in inlet side 1a of measurement flow path 1, for smooth flowing-in of the fluid to be measured.

Moreover, since propagation path 5 of the ultrasonic wave is made to be a V-shaped path, it is possible to dispose both ultrasonic vibrators 2 and 3 in the same face side of measurement flow path 1 (in the upper surface side of the measurement flow path shown in the figure), which allows the further-smaller-sized device.

Figure 2:
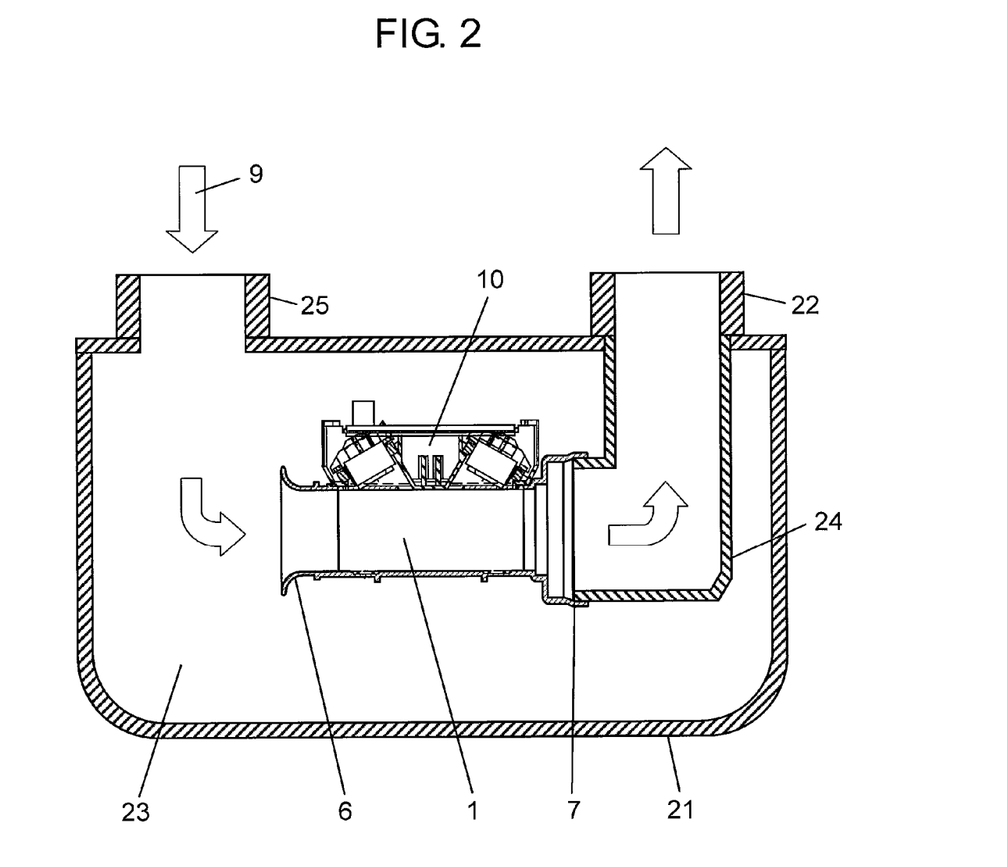
FIG. 2 is a cross-sectional view illustrating a state in which the ultrasonic flow rate measurement device is attached to a meter body, according to the first embodiment of the invention.

FIG. 2 is a cross-sectional view illustrating a state in which ultrasonic flow rate measurement device 10 according to the first embodiment of the invention is attached to meter body 21.

Meter body 21 includes meter inlet port 25, meter outlet port 22, buffering part 23, and delivery pipe 24. Note that flow direction 9 indicated by the arrow is the direction in which the fluid to be measured flows.

As shown in FIG. 2, ultrasonic flow rate measurement device 10 is integrated inside meter body 21 having a substantially rectangular-parallelepiped shape. The inlet side, in which inlet-side rectification part 6 is disposed, of ultrasonic flow rate measurement device 10 opens onto buffering part 23 of meter body 21. Moreover, delivery pipe 24 communicating with meter outlet port 22 of meter body 21 is hermetically joined to outlet-side coupling part 7 of ultrasonic flow rate measurement device 10. Meter inlet port 25 and meter outlet port 22 are disposed in the same face of meter body 21.

In this configuration, the fluid to be measured flows from meter inlet port 25 into buffering part 23 inside the meter, as indicated by the arrow (flow direction 9 of the fluid to be measured). Then, the fluid to be measured flows, from inlet-side rectification part 6 disposed in ultrasonic flow rate measurement device 10, into measurement flow path 1, and is subjected to the flow rate measurement with ultrasonic vibrators 2 and 3, and measurement circuit 4. After that, the fluid to be measured is discharged from meter outlet port 22 via delivery pipe 24.

According to this configuration, it is possible to easily dispose ultrasonic flow rate measurement device 10 inside the piping having a rectangular-parallelepiped shape.

Figure 3:
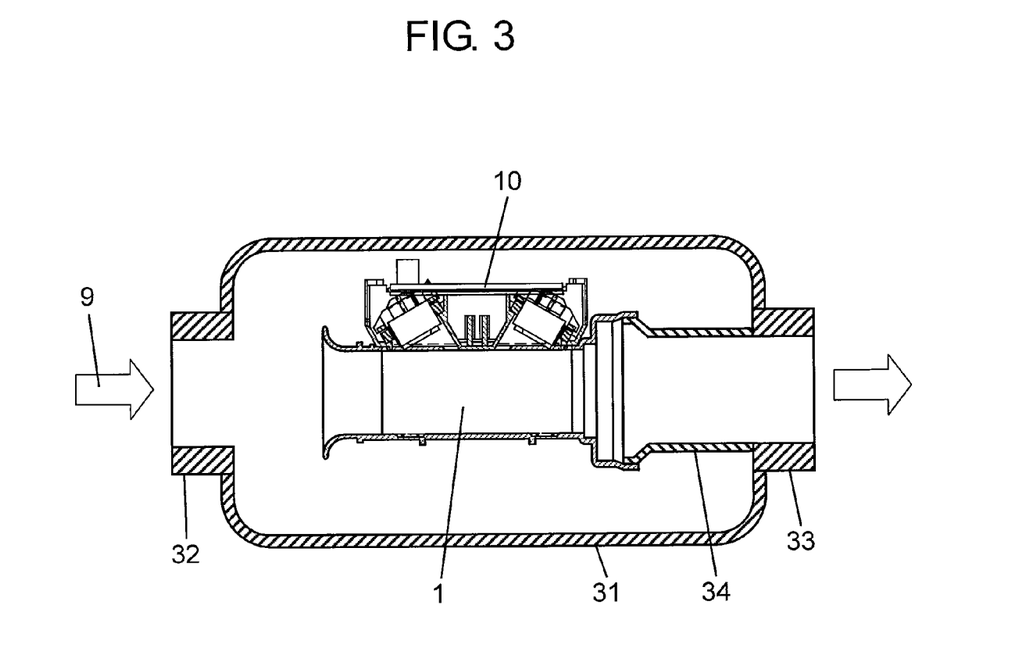
FIG. 3 is a cross-sectional view illustrating an example that the ultrasonic flow rate measurement device is attached to another meter body, according to the first embodiment of the invention.

FIG. 3 is a cross-sectional view illustrating an example that ultrasonic flow rate measurement device 10 according to the first embodiment of the invention is attached to another meter body 31.

In meter body 31, meter inlet port 32 and meter outlet port 33 are linearly arranged. Meter outlet port 33 communicates with delivery pipe 34.

As shown in FIG. 3, ultrasonic flow rate measurement device 10 is hermetically coupled with delivery pipe 34. According to this configuration, it is possible to dispose ultrasonic flow rate measurement device 10 at a midpoint of straight-pipe-shaped piping.

Figure 4:
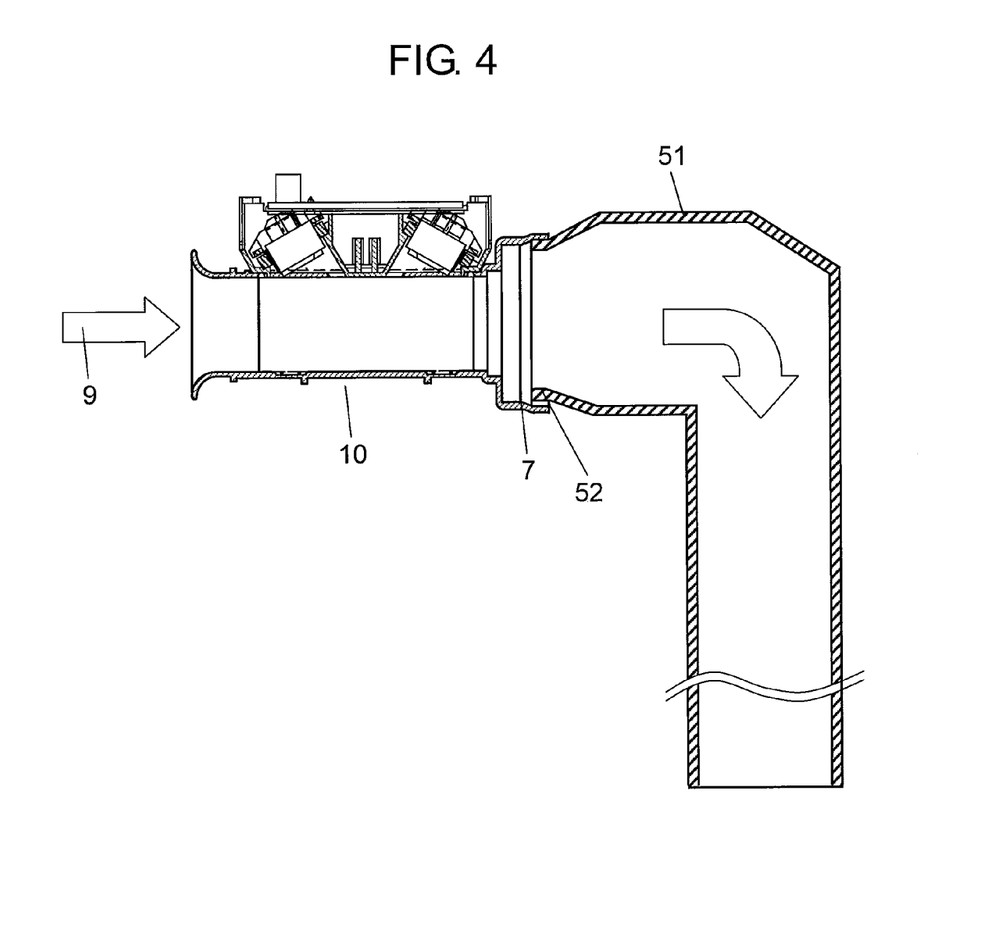
FIG. 4 is a cross-sectional view illustrating an example that the ultrasonic flow rate measurement device is attached to piping, according to the first embodiment of the invention.

FIG. 4 is a cross-sectional view illustrating an example that ultrasonic flow rate measurement device 10 according to the first embodiment of the invention is attached to piping 51.

As shown in FIG. 4, one side of piping 51 is opened. Outlet-side coupling part 7 of ultrasonic flow rate measurement device 10 is hermetically coupled with end portion 52 of piping 51. According to the configuration, it is possible to dispose ultrasonic flow rate measurement device 10 in order to measure the flow rate of a fluid flowing into piping 51.

As described above, use of ultrasonic flow rate measurement device 10 according to the embodiment, allows one ultrasonic flow rate measurement device 10 to be coupled with meters or piping which has a wide variety of configurations.

Second Exemplary Embodiment

Next, a configuration will be described of ultrasonic flow rate measurement device 61 according to a second embodiment of the present invention.

Figure 5A:
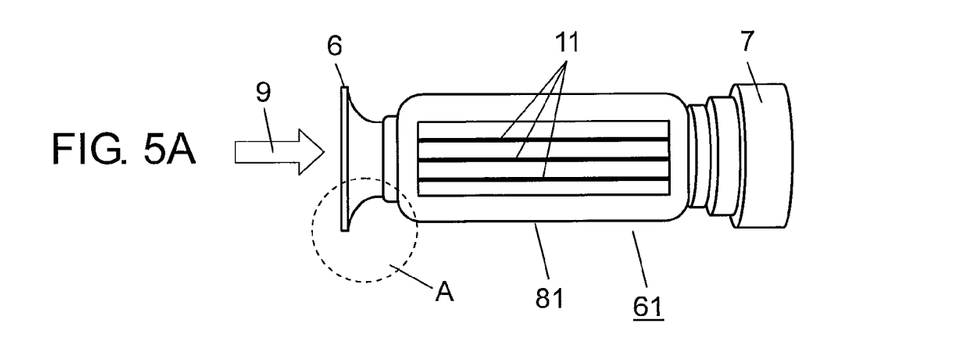
FIG. 5A is a plan view illustrating a configuration of an ultrasonic flow rate measurement device according to a second embodiment of the present invention.
Figure 5B:
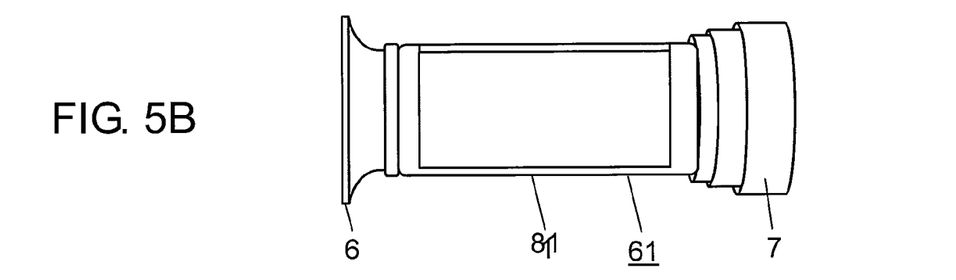
FIG. 5B is a side-elevational view illustrating the configuration of the ultrasonic flow rate measurement device according to the second embodiment of the invention.
Figure 5C:
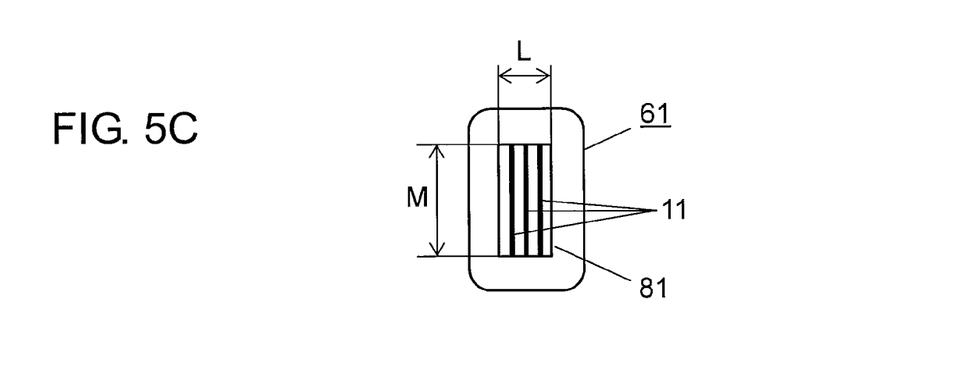
FIG. 5C is an elevation view of the ultrasonic flow rate measurement device as viewed from the inlet side, according to the second embodiment of the invention.
Figure 5D:
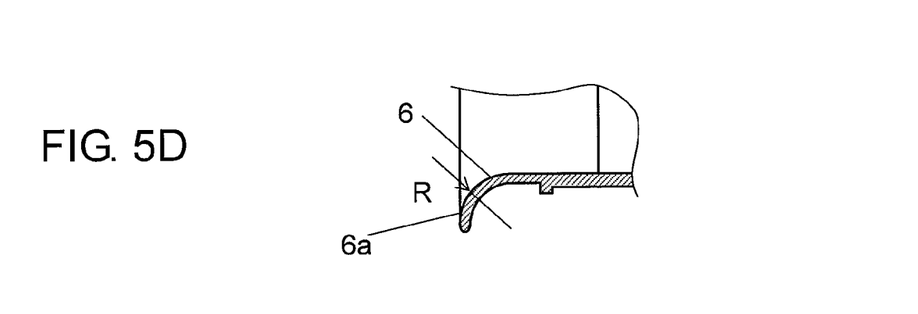
FIG. 5D is a partial cross-sectional view of region A in FIG. 5A of the ultrasonic flow rate measurement device according to the second embodiment of the invention.

FIG. 5A is a plan view illustrating a configuration of ultrasonic flow rate measurement device 61 according to the second embodiment of the invention. FIG. 5B is a side-elevational view of the configuration. FIG. 5C is an elevation view of the configuration as viewed from the inlet side thereof. FIG. 5D is a partial cross-sectional view of region A in FIG. 5A.

Note that, of the configurations included in ultrasonic flow rate measurement device 61, configurations of measurement flow path 81, inlet-side rectification part 6, and outlet-side coupling part 7 are shown in FIGS. 5A to 5D. The configurations shown in these figures are also true for measurement part 15 described in the first embodiment. Note also that a pair of ultrasonic vibrators 2 and 3 are disposed in a narrow side of the cross section of measurement flow path 81 to be described later.

As shown in FIG. 5C, the flow-path cross section of measurement flow path 81 has a rectangular shape with narrow side dimension L and long side dimension M. In ultrasonic flow rate measurement device 61, a plurality of reflectors 11 are disposed (see FIGS. 5A and 5C) such that the reflectors are in parallel with the long sides (the longitudinal direction in FIG. 5C) of the cross section of measurement flow path 1, and are in parallel with flow direction 9.

With reflectors 11, it is possible to reduce the influence of a difference in propagation time between the ultrasonic wave that propagates in straight lines between ultrasonic vibrators 2 and 3 and the ultrasonic wave that propagates via reflection on the wall surfaces of measurement flow path 81. With this configuration, even if the distance between ultrasonic vibrators 2 and 3 is short, it is possible to secure required measurement accuracy. Moreover, even if the entire length of measurement flow path 81 is short, reflectors 11 can offer the effect of stabilizing the flow inside measurement flow path 81.

In accordance with ultrasonic flow rate measurement device 61 according to the embodiment, the presence of reflectors 11 allows the configuration in which surroundings of the site, where the device is installed, hardly influence the measurement accuracy.

Moreover, as shown in FIG. 5D, in ultrasonic flow rate measurement device 61, inner peripheral surface 6a of inlet-side rectification part 6 is configured with a curved surface. The radius of the curved surface is R≥L/2, where R is the radius of the curved surface and L is the narrow side dimension of the cross section of measurement flow path 81. That is, the opening of inlet-side rectification part 6 is configured with the curve that becomes wider outward, with the curve having a radius of not less than ½ of the width dimension of the narrow side of the cross section of measurement flow path 81. This configuration allows turbulence in measurement flow path 81 to hardly occur even when a large amount of flow flows into the flow path.

In accordance with ultrasonic flow rate measurement device 61 according to the embodiment, the configuration of the opening described above allows stable measurement performance that is hardly influenced by the surroundings.

Third Exemplary Embodiment

Next, a third embodiment of the present invention will be described.

Figure 6:
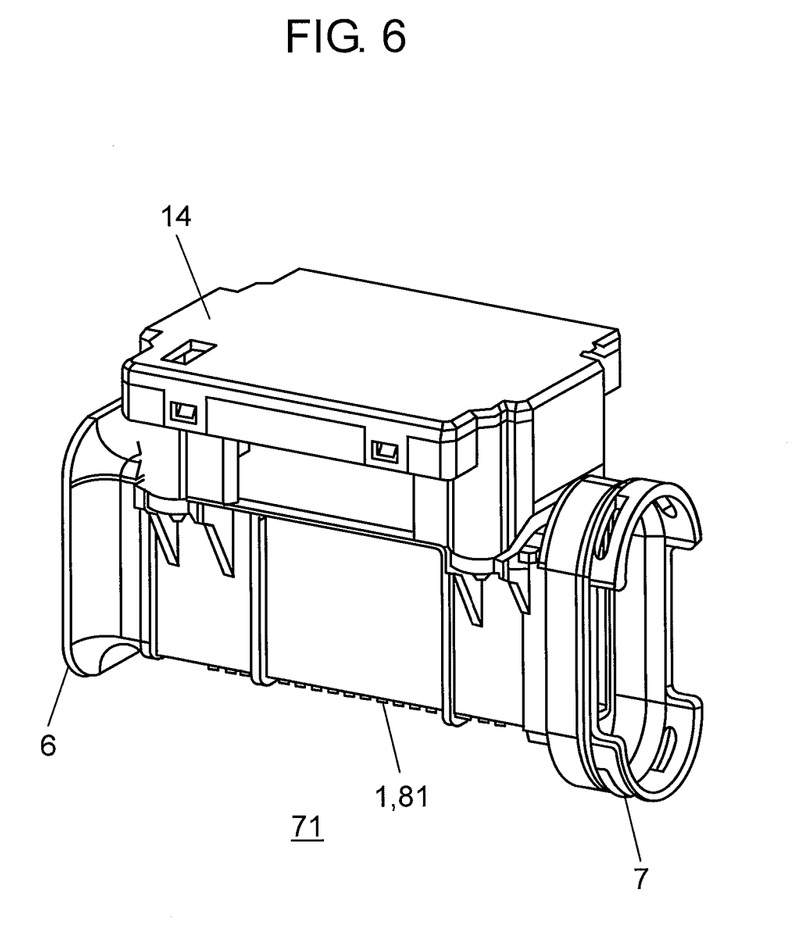
FIG. 6 is a perspective view illustrating an appearance of an ultrasonic flow rate measurement device according to a third embodiment of the present invention.

FIG. 6 is a perspective view illustrating an appearance of ultrasonic flow rate measurement device 71 according to the third embodiment of the invention.

In ultrasonic flow rate measurement device 71, each of the following components is totally configured with a resin, the components as follows: Measurement flow paths 1 and 81, inlet-side rectification part 6, outlet-side coupling part 7, and circuit case 14 that accommodates a measurement circuit.

In each of ultrasonic flow rate measurement devices 10 and 61 with the configurations described above, it is possible to reduce in size the whole of the device and to easily configure the shape thereof even with the resin, with a high degree of precision. Therefore, the whole of the device can be formed with the resin, which allows ultrasonic flow rate measurement device 71 that is further reduced in weight. Consequently, ultrasonic flow rate measurement device 71 allows easy installation thereof at a variety of sites.

As described above, in accordance with ultrasonic flow rate measurement devices 10, 61, and 71 described in the embodiments of the present invention, ultrasonic flowmeters are allowed which are capable of being easily integrated in a variety of piping and enclosures of meters, and capable of securing stable measurement accuracy.

Moreover, ultrasonic flow rate measurement devices 10, 61, and 71 can offer general versatility in installation thereof, and the measurement accuracy thereof is hardly influenced by surroundings of installation sites thereof. Consequently, the integration of ultrasonic flow rate measurement device 10, 61, or 71 allows the ultrasonic flowmeter capable of being tailored to a variety of the installation surroundings in a short development period of time, with an investment in the development and metal molds thereof being capped.

INDUSTRIAL APPLICABILITY

As described above, in accordance with the present invention, such exceptional advantages can be offered that there is no need for modifying shapes of measurement flow paths, coupling configurations of measurement circuits and ultrasonic vibrators, and the like, depending on piping with which flowmeters are coupled, installation sites, applications, or the like. Consequently, the present invention is useful for flow-rate measurement reference instruments, gas meters, water meters, and the like which are equipped with ultrasonic flow rate measurement devices.

The invention claimed is:

1. An ultrasonic flow rate measurement device, comprising:
    a pair of ultrasonic vibrators disposed in a direction such that a propagation path of an ultrasonic wave forms a V-shape relative to a measurement flow path in which a fluid to be measured flows;
    a measurement circuit for measuring a flow rate of the fluid to be measured, by measuring a propagation time of the ultrasonic wave between the pair of ultrasonic vibrators;
    an inlet-side rectification part disposed in an inlet side of the measurement flow path and that stabilizes a flow of the fluid to be measured;
    an outlet-side coupling part disposed in an outlet side of the measurement flow path; and
    a signal lead-out part for outputting a flow rate value measured with the measurement circuit;
    wherein the ultrasonic flow rate measurement device is installed by coupling the outlet-side coupling part to an installation structure and the inlet-side rectification part is detached from the installation structure.

2. The ultrasonic flow rate measurement device according to claim 1, wherein
    a flow-path cross section of the measurement flow path has a rectangular shape,
    the pair of ultrasonic vibrators are disposed in a narrow side of the cross section of the measurement flow path, and
    a plurality of reflectors are disposed in parallel with a flow direction inside the measurement flow path and in parallel with a long side of the cross section of the measurement flow path, for reducing an influence of a reflected wave of the ultrasonic wave in the propagation path.

3. The ultrasonic flow rate measurement device according to claim 2, wherein
    an opening of the inlet-side rectification part is configured with a curve becoming wider outward, the curve having a radius of not less than ½ of a width dimension of the narrow side of the cross section of the measurement flow path.

4. The ultrasonic flow rate measurement device according to claim 3, wherein the measurement flow path and a circuit case accommodating the measurement circuit are configured with a resin.

5. The ultrasonic flow rate measurement device according to claim 2, wherein the measurement flow path and a circuit case accommodating the measurement circuit are configured with a resin.

6. The ultrasonic flow rate measurement device according to claim 1, wherein the measurement flow path and a circuit case accommodating the measurement circuit are configured with a resin.

7. The ultrasonic flow rate measurement device according to claim 1, wherein the ultrasonic flow rate measurement device is installed in a meter body by coupling the outlet-side coupling part to a meter outlet port and the inlet-side rectification part is detached from a meter input port.

8. The ultrasonic flow rate measurement device according to claim 1, wherein the ultrasonic flow rate measurement device is installed in a meter body by coupling the outlet-side coupling part to a meter outlet port and the inlet-side rectification part is open into a space within the meter body.

9. The ultrasonic flow rate measurement device according to claim 1, wherein the ultrasonic flow rate measurement device is installed at a midpoint of an interior space of straight-pipe-shaped piping by coupling the outlet-side coupling part to an output port of a pipe and the inlet-side rectification part is open into the interior space of the straight-pipe-shaped piping.

10. The ultrasonic flow rate measurement device according to claim 1, wherein the ultrasonic flow rate measurement device is installed in a pipe by coupling the outlet-side coupling part to an input port of the pipe and the inlet-side rectification part is open.

* * * * *